United States Patent
Paulduro et al.

(10) Patent No.: US 10,386,104 B2
(45) Date of Patent: Aug. 20, 2019

(54) DOMESTIC REFRIGERATION DEVICE WITH A COOLANT CIRCUIT, AND METHOD FOR OPERATING A DOMESTIC REFRIGERATION DEVICE WITH A COOLANT CIRCUIT

(71) Applicant: BSH HAUSGERAETE GMBH, Munich (DE)

(72) Inventors: Achim Paulduro, Albeck (DE); Tommy Beckmann, Durchhausen (DE); Axel Walter, Berlin (DE); Moritz Klein, Giengen (DE)

(73) Assignee: BSH Hausgeraete GmbH, Munich (DE)

(*) Notice: Subject to any disclaimer, the term of this patent is extended or adjusted under 35 U.S.C. 154(b) by 168 days.

(21) Appl. No.: 15/551,654

(22) PCT Filed: Jan. 27, 2016

(86) PCT No.: PCT/EP2016/051632
§ 371 (c)(1),
(2) Date: Aug. 17, 2017

(87) PCT Pub. No.: WO2016/134908
PCT Pub. Date: Sep. 1, 2016

(65) Prior Publication Data
US 2018/0038622 A1    Feb. 8, 2018

(30) Foreign Application Priority Data
Feb. 23, 2015   (DE) .......................... 10 2015 203 144

(51) Int. Cl.
H02P 1/46    (2006.01)
F25B 13/00   (2006.01)
(Continued)

(52) U.S. Cl.
CPC ............ *F25B 49/025* (2013.01); *F25B 13/00* (2013.01); *F25B 31/026* (2013.01); *H02P 1/46* (2013.01);
(Continued)

(58) Field of Classification Search
CPC .......... H02P 21/00; H02P 21/22; H02P 21/34; H02P 1/46; H02P 3/18; H02P 27/04;
(Continued)

(56) References Cited

U.S. PATENT DOCUMENTS 7,650,760 B2 *   1/2010  Nakata ...................... H02P 6/06
                                                        318/722
9,136,788 B2 *   9/2015  Okubo .................... F04C 28/06
(Continued)

FOREIGN PATENT DOCUMENTS

DE        10206191 B4     2/2006
DE      102010030240 A1  12/2011
(Continued)

*Primary Examiner* — Antony M Paul
(74) *Attorney, Agent, or Firm* — Laurence A. Greenberg; Werner H. Stemer; Ralph E. Locher

(57) ABSTRACT

A domestic refrigeration device and a method for operating a domestic refrigeration device. The domestic refrigeration device has a heat-insulated body with a coolable inner container which delimits a coolable interior provided for storing food. A coolant circuit is provided for cooling the coolable interior and includes a compressor and a field-oriented electric drive. The field-oriented electric drive has a field-oriented controller, a converter, and a permanently excited synchronous motor which is connected downstream of the converter and which is part of the compressor or is provided for driving the compressor.

11 Claims, 3 Drawing Sheets

(51) Int. Cl.
*F25B 31/02* (2006.01)
*F25B 49/02* (2006.01)
*H02P 21/00* (2016.01)
*H02P 21/22* (2016.01)
*H02P 21/34* (2016.01)
*H02P 27/04* (2016.01)

(52) U.S. Cl.
CPC .............. *H02P 21/00* (2013.01); *H02P 21/22* (2016.02); *H02P 21/34* (2016.02); *H02P 27/04* (2013.01); *F25B 2600/024* (2013.01)

(58) Field of Classification Search
CPC .... H02P 27/06; H02P 1/00; H02P 3/00; H02P 6/00; H02P 23/00; H02P 27/00; H02P 41/00; H02P 41/02; H02P 6/14; F25B 49/025; F25B 13/00; F25B 31/026; F25B 2600/024
USPC .... 318/400.01, 400.02, 400.14, 400.15, 700, 318/701, 727, 779, 799, 800, 801, 430, 318/437, 432; 361/23, 30; 62/228.1, 230
See application file for complete search history.

(56) References Cited

U.S. PATENT DOCUMENTS

| | | |
|---|---|---|
| 2004/0008004 A1 | 1/2004 | Papiernik et al. |
| 2011/0056226 A1 | 3/2011 | Okubo et al. |
| 2013/0287602 A1* | 10/2013 | Suzuki .................. F04B 17/03 417/410.1 |

FOREIGN PATENT DOCUMENTS

| | | |
|---|---|---|
| EP | 0784378 A2 | 7/1997 |
| JP | 2005049013 A | 2/2005 |
| JP | 2007236048 A | 9/2007 |
| JP | 2008245411 A | 10/2008 |

* cited by examiner

DOMESTIC REFRIGERATION DEVICE WITH A COOLANT CIRCUIT, AND METHOD FOR OPERATING A DOMESTIC REFRIGERATION DEVICE WITH A COOLANT CIRCUIT

BACKGROUND OF THE INVENTION

Field of the Invention

The invention relates to a domestic refrigeration appliance with a refrigerant circuit and a method for operating a domestic refrigeration appliance with a refrigerant circuit.

Domestic refrigeration appliances comprise a coolable interior chamber for storing food and a refrigerant circuit for cooling the coolable interior chamber. The refrigerant circuit in particular comprises a compressor, a condenser connected downstream of the compressor, a restrictor apparatus connected downstream of the condenser and an evaporator, which is arranged between the restrictor apparatus and the compressor.

DE 10 2010 030 240 A1 discloses such a domestic refrigeration appliance, in which the compressor is driven with a brushless direct current motor. A brushless direct current motor is generally a permanently excited three-phase synchronous motor. The brushless direct current motor is activated by an inverter.

Permanently excited three-phase synchronous motors can be part of a controlled electric drive, the controller of which can be configured as a field-oriented controller known in principle to the person skilled from DE 102 06 191 B4 for example. With field-oriented control, also referred to as vector control, the electric voltages and currents of the three-phase synchronous motor are combined in the form of space vectors. The space vectors relate to a fixed-stator coordinates system and move synchronously with the rotor of the three-phase synchronous motor. In order to relate the variables to the rotor, said variables are transformed to a fixed-rotor d, q coordinates system.

For field-oriented control a control structure results, with which the transformed currents $i_d$ (longitudinal current), $i_q$ (transverse current) are controlled, preferably by means of PI controllers. Such current controllers form internal current control circuits within a cascade structure, with an external speed control circuit superimposed thereon. The transverse current $i_q$ here mainly supplies the torque (main torque) of the three-phase synchronous motor. The target value of the current control loop for the longitudinal current $i_d$ is generally "zero". FIG. 1 of DE 102 06 191 B4 shows such a control structure for an asynchronous motor. When a three-phase synchronous motor is used, the flux calculator cited in DE 102 06 191 B4 is omitted and the target value of the current control loop for the longitudinal current $i_d$ is "zero".

With permanently excited three-phase synchronous motors, as for example with what are referred to as brushless direct current motors (BLDC motors) the transverse inductances $L_q$ and longitudinal inductances $L_d$ assigned to the transverse and longitudinal currents can have different values. The longitudinal current $i_d$ can therefore also supply a torque (reluctance contribution, reluctance torque).

It is also known for example from DE 102 06 191 B4 that with the permanently excited three-phase synchronous motor the speed range can be extended upward if a field-counteracting current is injected in the upper speed range. To this end the target value of the current control loop for the longitudinal current $i_d$ is selected as smaller than "zero", thereby however reducing the overall torque of the permanently excited three-phase synchronous motor. This is referred to as field weakening mode.

SUMMARY OF THE INVENTION

It is the object of the invention to specify a domestic refrigeration appliance, which has a coolable interior chamber and a refrigerant circuit provided to cool the coolable interior chamber with a compressor, the electric drive of which is provided to drive the compressor, has a permanently excited three-phase synchronous motor and has an improved operating response, in particular an improved start-up response.

The object of the invention is achieved by a domestic refrigeration appliance, having a thermally insulated carcass with a coolable inner container, which delimits a coolable interior chamber provided to store food, a refrigerant circuit provided to cool the coolable interior chamber with a compressor and a controlled electric drive, which has a field-oriented controller, a converter and a permanently excited three-phase synchronous motor, which is connected downstream of the converter and which is part of the compressor or is provided to drive the compressor, the field-oriented controller having a first current control circuit provided to control a transverse current generating a main torque of the permanently excited three-phase synchronous motor, a second current control circuit provided to control a longitudinal current for the permanently excited three-phase synchronous motor and a speed control circuit superimposed on the current control circuits, which generates a transverse current target value for the first current control circuit as a function of a predetermined target speed for the permanently excited three-phase synchronous motor and an actual speed of the permanently excited three-phase synchronous motor, and the output signals of the two current control circuits are provided at least indirectly to activate the converter, and the domestic refrigeration appliance being designed to determine a target speed for the field-oriented controller as a function of a cooling requirement for the coolable interior chamber to start up the permanently excited three-phase synchronous motor from stationary and to adjust a longitudinal current target value provided for the second current control circuit or its magnitude starting from "zero" to a predetermined value within a first time period according to a predetermined profile, so that the permanently excited three-phase synchronous motor generates an additional torque to the main torque due to the resulting longitudinal current, so that the overall torque of the permanently excited three-phase synchronous motor is greater than the main torque.

A further aspect of the invention is a method for operating a domestic refrigeration appliance, which has a thermally insulated carcass with a coolable inner container, which delimits a coolable interior chamber provided to store food, a refrigerant circuit provided to cool the coolable interior chamber with a compressor and a field-oriented electric drive, the field-oriented controlled electric drive having a field-oriented controller, a converter and a permanently excited three-phase synchronous motor, which is connected downstream of the converter and which is part of the compressor or is provided to drive the compressor, the field-oriented controller having a first current control circuit provided to control a transverse current generating a main torque of the permanently excited three-phase synchronous motor, a second current control circuit provided to control a longitudinal current for the permanently excited three-phase synchronous motor and a speed control circuit superimposed on the current control circuits, which generates a transverse current target value for the first current control circuit as a function of a predetermined target speed for the permanently excited three-phase synchronous motor and an actual speed of the permanently excited three-phase synchronous motor, and the output signals of the two current control circuits are provided at least indirectly to activate the converter, having the following method steps:

for starting up the permanently excited three-phase synchronous motor from stationary, implementing a target speed for the field-oriented controller as a function of a cooling requirement for the coolable interior chamber, and approaching a longitudinal current target value provided for the second current control circuit or its magnitude starting from "zero" to a predetermined value within a first time period according to a predetermined profile, so that the permanently excited three-phase synchronous motor generates an additional torque to the main torque due to the resulting longitudinal current, so that the overall torque of the permanently excited three-phase synchronous motor is greater than the main torque.

The inventive domestic refrigeration appliance is thus configured to execute the inventive method.

The inventive domestic refrigeration appliance comprises the thermally insulated carcass with the inner container, which delimits the coolable interior chamber. The coolable interior chamber is provided to store food and is cooled by means of the refrigerant circuit.

The coolable interior chamber can preferably be closed by means of a door leaf. The door leaf is preferably mounted in such a manner that it can pivot in relation to an axis which preferably runs vertically. The coolable interior chamber is accessible in the opened state.

The refrigerant circuit per se is known in principle to the person skilled in the art and comprises the compressor and in particular a condenser connected downstream of the compressor, a restrictor apparatus connected downstream of the condenser and an evaporator, which is arranged between the restrictor apparatus and the compressor.

During operation of the inventive domestic refrigeration appliance the compressor is driven by means of the permanently excited three-phase synchronous motor. The permanently excited three-phase synchronous motor can also be part of the compressor.

During operation of the compressor the permanently excited three-phase synchronous motor is operated at a speed determined or predetermined for example by an electronic control apparatus or a temperature controller. The permanently excited three-phase synchronous motor is therefore part of the controlled electric drive. The electric controlled drive is based on field-oriented control for an improved control response.

The field-oriented controller comprises the two current control circuits, of which the first current control circuit is provided to control the transverse current and the second current control circuit is provided to control the longitudinal current of the permanently excited three-phase synchronous motor. The output signals of the two current control circuits are provided to activate the converter at least indirectly. The reference variable of the first current control circuit is in particular the transverse current target value and the reference variable of the second current control circuit is in particular the longitudinal current target value.

The first current control circuit can preferably have a first current controller and the second current control circuit can preferably have a second current controller. The two current controllers are preferably PI current controllers. The input signal for the first current controller is preferably a deviation of the transverse current actual value from the transverse current target value and the input signal for the second current controller is preferably a deviation of the longitudinal current actual value from the longitudinal current target value.

Superimposed on the two current control circuits is the speed control circuit, which generates the transverse current target value for the first current control circuit as a function of a predetermined target speed for the permanently excited three-phase synchronous motor and an actual speed of the permanently excited three-phase synchronous motor. The reference variable of the speed control circuit is preferably the target speed of the permanently excited three-phase synchronous motor.

The speed control circuit preferably comprises a speed controller, which is embodied in particular as a PI speed controller. The input signal for the speed controller is preferably a deviation of the actual speed from the target speed.

As already set out in the introduction, the transverse current is responsible for the main torque of the permanently excited three-phase synchronous motor. With permanently excited three-phase synchronous motors however the longitudinal current can also generate an additional torque, which increases the overall torque of the permanently excited three-phase synchronous motor when applied correspondingly. This is the case in particular with brushless direct current motors, which is why the permanently excited three-phase synchronous motor is preferably a brushless direct current motor.

In order to improve the start-up response of the compressor or permanently excited three-phase synchronous motor, according to the invention a target torque is first determined with the permanently excited three-phase synchronous motor stationary for example by means of the electronic control apparatus based on a required cooling of the coolable interior chamber, in order to operate the field-oriented controller or the speed control circuit or the speed controller accordingly. This produces the main torque.

In order to obtain additional torque to the main torque during start-up, according to the invention the longitudinal current target value is predetermined accordingly. According to the invention the longitudinal current target value provided for the second current control circuit or its magnitude is adjusted or increased starting from "zero" to the predetermined value in such a manner within the first time period that the overall torque of the permanently excited three-phase synchronous motor is greater than the main torque. Because the longitudinal current target value or its magnitude is also approached, preferably constantly increased, within the first time period according to a predetermined profile, there is no need for complex calculation of the longitudinal current target value, with the result that the computation power of the domestic refrigeration appliance can be relatively low.

The constant increasing of the longitudinal current target value or its magnitude is preferably ramp-like during the first time period. The profile of the adjustment, preferably of the constant increasing, is preferably stored in a look-up table. The look-up table can be for example part of the electronic control apparatus. The profile can also be determined by means of a mathematical formula.

As soon as the permanently excited three-phase synchronous motor has been started up, provision can be made for the longitudinal current target value to be reduced to "zero" again.

According to one embodiment provision is therefore made for reducing the longitudinal current target value or its magnitude to "zero" as soon as the permanently excited three-phase synchronous motor reaches a stable working point, in order then to operate the field-oriented controller with a longitudinal current target value equal to "zero". The stable working point can be identified for example when the deviation between the target speed and the actual speed is below a predetermined value.

According to one embodiment provision is preferably made for reducing the longitudinal current target value or its magnitude to "zero" after a predetermined second time period, in order then to operate the field-oriented controller with a longitudinal current target value equal to "zero". As the second time period is predetermined, relatively little computation power is needed again. The second time period is in particular selected to be of such a length that the permanently excited three-phase synchronous motor reaches a stable working point reliably.

In order in particular to embody the electric drive relatively robustly, the longitudinal current target value or its magnitude is preferably reduced from its predetermined value to "zero" within a predetermined third time period according to a predetermined profile. This profile is preferably ramp-like and/or preferably stored in the look-up table.

In order also to be able to operate the permanently excited three-phase synchronous motor at relatively high speeds, provision can be made for operating the electric drive in a field weakening mode.

BRIEF DESCRIPTION OF THE SEVERAL VIEWS OF THE DRAWING

An exemplary embodiment of the invention is shown by way of example in the accompanying schematic drawings, in which.

DESCRIPTION OF THE INVENTION

Figure 1:
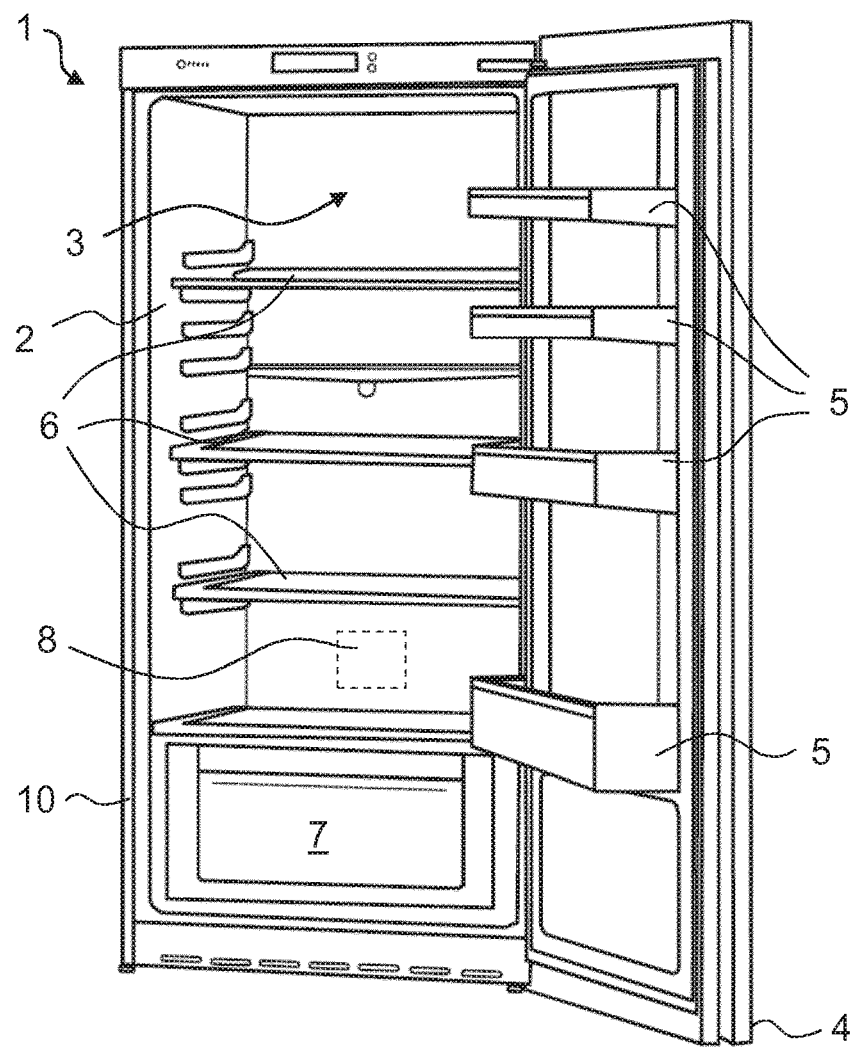
FIG. 1 shows a perspective view of a domestic refrigeration appliance.

FIG. 1 shows a perspective view of a domestic refrigeration appliance 1, which comprises a thermally insulated carcass 10 with an inner container 2, which delimits a coolable interior chamber 3. The coolable interior chamber 3 is provided for storing food (not shown in detail).

In the present exemplary embodiment the domestic refrigeration appliance 1 has a pivotable door leaf 4 for closing the coolable interior chamber 3. The door leaf 4 is mounted in particular in such a manner that it can pivot in relation to a vertical axis. The coolable interior chamber 3 is accessible when the door leaf 4 is open, as shown in FIG. 1.

In the present exemplary embodiment a number of door trays 5 for storing food are arranged on the face of the door leaf 4 facing in the direction of the coolable interior chamber 3. In particular a number of compartment bases 6 for storing food are arranged in the coolable interior chamber 3 and in particular a drawer 7, in which food can also be stored, is arranged in the lower region of the coolable interior chamber 3.

Figure 2:
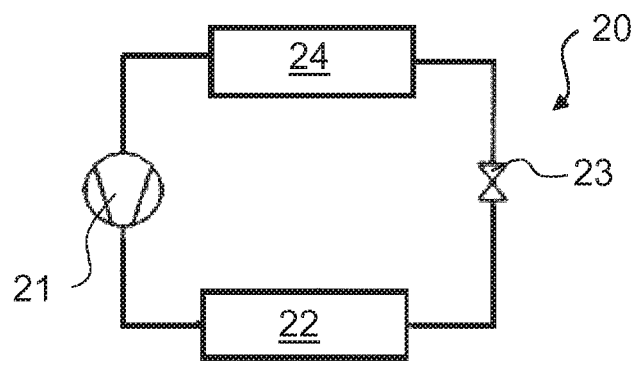
FIG. 2 shows a refrigerant circuit of the domestic refrigeration appliance.

The domestic refrigeration appliance 1 comprises a refrigerant circuit 20, shown in FIG. 2, for cooling the coolable interior chamber 3. In the present exemplary embodiment the refrigerant circuit 20 of the coolable interior chamber 3 comprises a compressor 21, a condenser 22 connected downstream of the compressor 21, a restrictor apparatus 23 connected downstream of the condenser 22, which is embodied in particular as a restrictor tube or capillary tube, and an evaporator 24, which is arranged between the restrictor apparatus 23 and the compressor 21. The compressor 21 is preferably arranged within a machine chamber of the domestic refrigeration appliance 1, which is located in particular behind the drawer 7.

In the present exemplary embodiment the domestic refrigeration appliance 1 comprises an electronic control apparatus 8, which is designed to activate the refrigeration apparatus, in particular the compressor 21 of the refrigerant circuit 20, in a manner generally known to the person skilled in the art in such a manner that the coolable interior chamber 3 has at least roughly a predetermined or predeterminable target temperature. The electronic control apparatus 8 is preferably designed such that it controls the temperature of the coolable interior chamber 3. In order to obtain the actual temperature of the coolable interior chamber 3 if required, the domestic refrigeration appliance 1 can have at least one temperature sensor (not shown in detail) connected to the electronic control apparatus 8.

Figure 3:
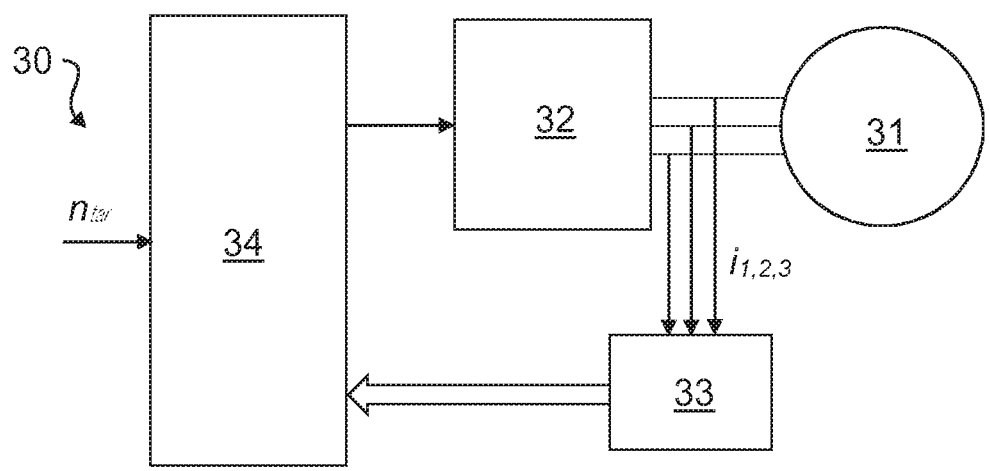
FIG. 3 shows an electric drive controlled in a field-oriented manner for the compressor of the refrigerant circuit.

In order to activate or control the refrigerant circuit 20, the domestic refrigeration appliance comprises a controlled electric drive 30, as shown in FIG. 3, which has a permanently excited three-phase synchronous motor, which is preferably embodied as a brushless direct current motor 31. The brushless direct current motor 31 is coupled to the compressor 21 or is part of the compressor 21 and drives this as required according to a target speed $n_{tar}$ predetermined by the electronic control apparatus 8. The target speed $n_{tar}$ is calculated or predetermined in particular by the electronic control apparatus 8 based on an intended cooling of the coolable interior chamber 3, for example based on the current temperature and the target temperature of the coolable interior chamber 3.

The controlled electric drive 30 comprises a controlling element for driving the brushless direct current motor 31. The controlling element is embodied as a converter 32 and generates a three-phase or multiphase voltage during operation of the electric drive 30, the fundamental oscillation of said voltage having a fundamental frequency and amplitude which are an indirect function of the target speed $n_{tar}$ and an actual speed $n_{act}$ of the brushless direct current motor 31.

In the present exemplary embodiment the controlled electric drive 30 has measurement apparatuses 33, which are used to measure the electric phase currents $i_{1,2,3}$ of the brushless direct current motor 31 and to determine the actual speed. The measurement apparatuses 33 edit the determined actual speed $n_{act}$ and the measured electric phase currents $i_{1,2,3}$ of the brushless direct current motor 31 as required, so that the determined actual speed $n_{act}$ and the measured electric phase currents $i_{1,2,3}$ of the brushless direct current motor 31 can be processed by a field-oriented controller 34 of the controlled electric drive 30 in a suitable form. The actual speed $n_{act}$ can be determined for example, as provided for in the present exemplary embodiment, from the measured phase currents $i_{1,2,3}$. The actual speed $n_{act}$ can however also be measured directly using an appropriate sensor.

In the present exemplary embodiment the control of the controlled electric drive 30 is based on field-oriented control. The principal control structure of such control is known for example from DE 102 06 191 B4, as cited in the introduction. The essential difference between the field-oriented control of the electric drive 30 and conventional field-oriented control is the predetermination of the target values for the longitudinal current $i_d$ during operation of the domestic refrigeration appliance 1, in particular for starting up the compressor 21 or the brushless direct current motor 31.

The field-oriented controller 34 forms a cascade structure with internal current control circuits, on which an external speed control circuit is superimposed.

A control structure in which the transformed transverse and longitudinal currents $i_q$, $i_d$ are controlled by means of the current control circuits results for field-oriented control. In the present exemplary embodiment the current control circuits preferably comprise a first current controller 41 for the transverse current $i_q$ and a second current controller 41 for the longitudinal current $i_d$. The two current controllers 41, 42 are in particular PI controllers.

In the present exemplary embodiment the field-oriented controller 34 is embodied in such a manner that it transforms the phase currents $i_{1,2,3}$ of the brushless direct current motor 31 into fixed-rotor longitudinal and transverse current actual values $i_{s,d}$, $i_{s,q}$ relating to the rotor of the brushless direct current motor 31. The deviation between the target value $i_{q,tar}$ of the transverse current $i_q$ and the transverse current actual value $i_{s,q}$ is the input signal for the first current controller 41 and the deviation between the longitudinal current target value $i_{d,tar}$ and the longitudinal current actual value $i_{s,d}$ is the input signal for the second current controller 42.

The output signals of the two current controllers 41, 42 correspond to transformed electric voltages $u_q$, $u_d$, which are transformed by means of a transformation (not shown but known in principle to the person skilled in the art) into signals suitable for activating the converter 32.

In the present exemplary embodiment the transverse current target value $i_{q,tar}$ results from this external speed control circuit, which is calculated as a function of the target speed $n_{tar}$ and the actual speed $n_{act}$, in particular as a function of the speed deviation $n_{dev}$, which results from the measured and predetermined target speed $n_{tar}$.

In the present exemplary embodiment the speed control circuit comprises a speed controller 43, which is preferably embodied as a PI controller. The output signal of the speed controller 43 is the transverse current target value $i_{q,tar}$.

The brushless direct current motor 31 is embodied in such a manner that the longitudinal current $i_d$ is also able to form a torque-forming component, which acts in addition to the main torque generated by the transverse current $i_q$ with a corresponding longitudinal current $i_d$. It is thus possible to increase the overall torque above the main torque of the brushless direct current motor 31 with a corresponding longitudinal current $i_d$.

In the present exemplary embodiment the domestic refrigeration appliance 1 is embodied in such a manner that it generates different longitudinal current target values $i_{d,tar}$ depending on the operating mode. The longitudinal current target values $i_{d,tar}$ are preferably saved in a look-up table, which is stored in particular in the electronic control apparatus 8, or are determined by means of a mathematical equation.

Figure 4:
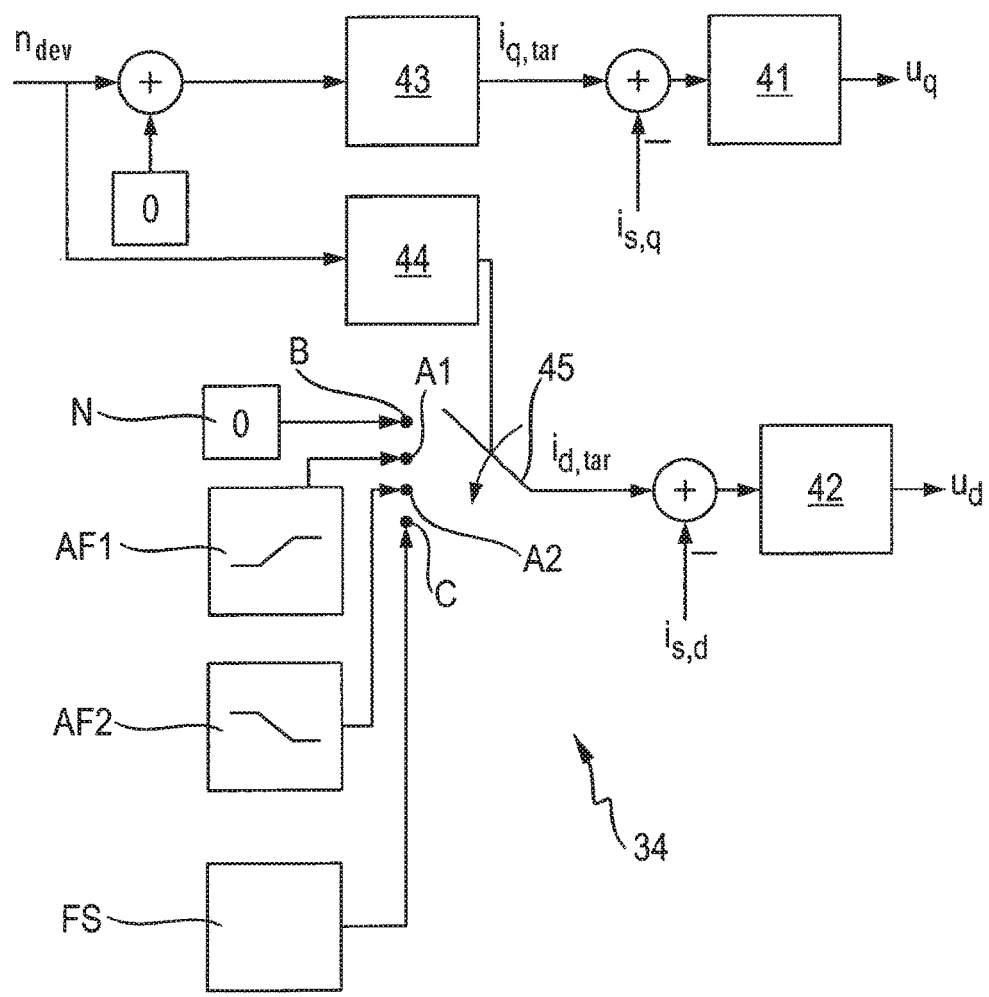
FIG. 4 shows a part of the current controller of the field-oriented controller.

The decision as to which longitudinal current target value $i_{d,tar}$ is currently applicable is illustrated in FIG. 4 by a function block 44, which actuates a function switch 45.

As the compressor 21 starts up, in other words as the stationary brushless direct current motor 31 starts up to a target speed $n_{tar}$, in the present exemplary embodiment the electronic control apparatus 8 first predetermines the target speed $n_{tar}$ for the brushless direct current motor 31. The controlled electric drive 30 is also first operated in a start-up mode, as illustrated functionally by function blocks AF1 and AF2 in FIG. 4.

In start-up mode the longitudinal current target value $i_{d,tar}$ or its magnitude is first increased constantly starting from "zero" according to a predetermined profile, until the longitudinal current target value $i_{d,tar}$ or its magnitude reaches a predetermined value. The longitudinal current target value $i_{d,tar}$ here is selected such that as a result the brushless direct current motor 31 generates an additional torque to the main torque generated by the transverse current $i_q$, said additional torque becoming ever larger due to the constantly increasing longitudinal current $i_d$, so that the overall torque of the brushless direct current motor 31 is greater than the main torque. The profile of the constant increasing is permanently predetermined and is preferably stored in the look-up table.

The longitudinal current target value $i_{d,tar}$ or its magnitude is preferably increased in a ramp-like manner starting from "zero", as shown by the function block AF1. For this part of start-up mode the function block 44 switches the function switch 45 to a switch position "A1".

In the present exemplary embodiment the increasing of the longitudinal current target value $i_{d,tar}$ or its magnitude is time controlled, in other words the longitudinal current target value $i_{d,tar}$ or its magnitude reaches its predetermined value after a predetermined first time period $T_1$. When said predetermined value is reached, the vectors of the longitudinal current $i_d$ and the vector of the transverse current $i_q$ have a defined angle in the settled or adjusted state.

In the present exemplary embodiment provision is made for the longitudinal current target value to be set to "zero" after the end of start-up mode, in particular when the brushless direct current motor 31 reaches a stable working point and in particular is to be operated at a relatively low speed or at a speed below the maximum speed of preferably less than 0.6 times the maximum speed. This is illustrated by a function block N in FIG. 4.

The stable working point is reached for example when the speed deviation $n_{dev}$, which results from the measured actual speed $n_{act}$ and the predetermined target speed $n_{tar}$, is below a predetermined value.

In the present exemplary embodiment provision is however also made for the longitudinal current target value $i_{d,tar}$ to be set to "zero" after a predetermined second time period $T_2$ after the end of the first time period $T_1$. When the longitudinal current target value $i_{d,tar}$ is set to "zero", the function switch 45 is switched to a switch position "B".

In the present exemplary embodiment however the longitudinal current target value $i_{d,tar}$ is not set to "zero" abruptly but is returned constantly from its predetermined value to "zero". This is preferably carried out within a predetermined third time period $T_3$. The longitudinal current target value $i_{d,tar}$ or its magnitude is preferably reduced in a ramp-like manner starting from the predetermined value, as shown by the function block AF2.

For this part of start-up mode the function block 44 switches the function switch 45 to a switch position "A2".

In the present exemplary embodiment provision is also made for the brushless direct current motor 31 to be able to be operated at a higher speed. To achieve this, the electric drive 30 can be operated in a field weakening mode, as shown by a function block FS in FIG. 4. The field weakening mode of a permanently excited three-phase synchronous motor is known in principle to the person skilled in the art and is therefore not described here.

In field weakening mode a field-counteracting current is injected into the brushless direct current motor 31. To this end the longitudinal current target value $i_{d,tar}$ is selected to be smaller than "zero". For field weakening mode the function switch 45 is switched to a switch position "D".

LIST OF REFERENCE CHARACTERS

1 Domestic refrigeration appliance
2 Inner container
3 Coolable interior chamber
4 Door leaf
5 Door tray
6 Compartment bases
7 Drawer
8 Electronic control apparatus
10 Carcass
20 Refrigerant circuit
21 Compressor
22 Condenser
23 Restrictor apparatus
24 Evaporator
30 Controlled electric drive
31 Brushless direct current motor
32 Converter
33 Measurement apparatuses
34 Field-oriented controller
41, 42 Current controller
43 Speed controller
44 Function block
45 Function switch
AF1, AF2 Function block
A1, A2, B, C Switch position
FS, N Function block
$i_{s,d}$ Longitudinal current actual value
$i_{s,q}$ Transverse current actual value
$i_{q,tar}$ Transverse current target value
$i_{d,tar}$ Longitudinal current target value
$i_{1,2,3}$ Phase currents
$n_{tar}$ Target speed
$u_q$, $u_d$ Transformed electric voltages
$n_{dev}$ Speed deviation

The invention claimed is:

1. A method for operating a domestic refrigeration appliance,
the appliance having:
a thermally insulated body with a coolable inner container delimiting a coolable interior chamber for storing food, a refrigerant circuit for cooling the coolable interior chamber with a compressor and a controlled electric drive;
wherein the controlled electric drive has a field-oriented controller, a converter and a permanently excited three-phase synchronous motor, which is connected downstream of the converter and which is part of the compressor or configured to drive the compressor;
wherein the field-oriented controller has a first current control circuit configured to control a transverse current generating a main torque of the permanently excited three-phase synchronous motor, a second current control circuit configured to control a longitudinal current for the permanently excited three-phase synchronous motor and a speed control circuit super ordinate to the first and second current control circuits, the speed control circuit generating a transverse current target value for the first current control circuit as a function of a predetermined target speed for the permanently excited three-phase synchronous motor and an actual speed of the permanently excited three-phase synchronous motor, and wherein output signals of the first and second current control circuits are provided at least indirectly to activate the converter;
the method comprising the following method steps:
for starting up the permanently excited three-phase synchronous motor from standstill, implementing a target speed for the field-oriented controller as a function of a cooling requirement for the coolable interior chamber; and
approaching a longitudinal current target value provided for the second current control circuit or its magnitude starting from "zero" to a predetermined value within a first time period according to a predetermined profile, to cause the permanently excited three-phase synchronous motor to generate an additional torque to the main torque due to a resulting longitudinal current, so that an overall torque of the permanently excited three-phase synchronous motor is greater than the main torque.

2. The method according to claim 1, wherein the first current control circuit has a first current controller and the second current control circuit has a second current controller and an input signal for the first current controller is a deviation of the transverse current actual value from the transverse current target value and an input signal for the second current controller is a deviation of the longitudinal current actual value from the longitudinal current target value.

3. The method according to claim 1, which comprises adjusting the longitudinal current target value or a magnitude thereof in a ramp shape during the first time period and which comprises storing an adjustment profile in a look-up table or determining the adjustment profile by way of a mathematical formula.

4. The method according to claim 1, which comprises adjusting the longitudinal current target value or a magnitude thereof in accordance with an adjustment profile stored in a look-up table or determined by way of a mathematical formula.

5. The method according to claim 4, which comprises reducing the longitudinal current target value or the magnitude thereof from a predetermined value to "zero" within a predetermined third time period according to a predetermined profile.

6. The method according to claim 1, which further comprises:
reducing the longitudinal current target value or a magnitude thereof to "zero" as soon as the permanently excited three-phase synchronous motor reaches a stable working point or after a predetermined second time period; and
subsequently operating the field-oriented controller with a longitudinal current target value equal to "zero".

7. A domestic refrigeration appliance, comprising:
a thermally insulated body with a coolable inner container delimiting a coolable interior chamber for storing food;
a refrigerant circuit configured to cool said coolable interior chamber, said refrigerant circuit including a compressor and a field-oriented electric drive, which has a field-oriented controller, a converter and a permanently excited three-phase synchronous motor, which is connected downstream of said converter and which forms part of said compressor or is configured to drive said compressor;

said field-oriented controller having a first current control circuit provided to control a transverse current generating a main torque of said permanently excited three-phase synchronous motor, a second current control circuit provided to control a longitudinal current for said permanently excited three-phase synchronous motor and a speed control circuit super ordinate of said first and second current control circuits, said speed control circuit generating a transverse current target value for said first current control circuit as a function of a predetermined target speed for said permanently excited three-phase synchronous motor and an actual speed of said permanently excited three-phase synchronous motor;

said first and second current control circuits carrying output signals for directly or indirectly activating said converter, and wherein:

for starting up said permanently excited three-phase synchronous motor from standstill, a target speed for said field-oriented controller is determined as a function of a cooling requirement for said coolable interior chamber, and a longitudinal current target value for said second current control circuit or a magnitude thereof is adjusted starting from "zero" to a predetermined value within a first time period according to a predetermined profile, to cause said permanently excited three-phase synchronous motor to generate an additional torque to the main torque due to the resulting longitudinal current, so that an overall torque of said permanently excited three-phase synchronous motor is greater than the main torque.

8. The domestic refrigeration appliance according to claim 7, wherein said first current control circuit has a first current controller and said second current control circuit has a second current controller and an input signal for said first current controller is a deviation of the transverse current actual value from the transverse current target value and an input signal for said second current controller is a deviation of the longitudinal current actual value from the longitudinal current target value.

9. The domestic refrigeration appliance according to claim 7, wherein an adjustment of the longitudinal current target value or the magnitude thereof is ramp-like during the first time period and/or wherein a profile of the adjustments is stored in a look-up table or is calculated by way of a mathematical formula.

10. The domestic refrigeration appliance according to claim 7, wherein the longitudinal current target value or the magnitude thereof is decreased to "zero" as soon as said permanently excited three-phase synchronous motor reaches a stable working point or after a predetermined second time period, and wherein the field-oriented controller is subsequently operated with a longitudinal current target value equal to "zero".

11. The domestic refrigeration appliance according to claim 10, wherein the longitudinal current target value or the magnitude thereof is reduced from its predetermined value to "zero" within a predetermined third time period according to a predetermined profile.

* * * * *